United States Patent [19]
Arao et al.

[11] Patent Number: 5,673,589
[45] Date of Patent: Oct. 7, 1997

[54] AUTOMOTIVE PEDAL SUPPORT SYSTEM

[75] Inventors: Tetuya Arao; Michiyuki Murakami; Ryo Tanahashi, all of Kariya, Japan

[73] Assignee: Tsuda Kogyo Kabushiki Kaisha, Kariya, Japan

[21] Appl. No.: 471,172

[22] Filed: Jun. 6, 1995

[30] Foreign Application Priority Data

Sep. 20, 1994 [JP] Japan .................... 6-225116

[51] Int. Cl.⁶ .................................................. G05G 1/14
[52] U.S. Cl. .................................... 74/512; 74/560
[58] Field of Search ................... 74/512–514, 560

[56] References Cited

U.S. PATENT DOCUMENTS

| | | | |
|---|---|---|---|
| 3,939,726 | 2/1976 | Ahrens | 74/513 |
| 4,005,616 | 2/1977 | Casey | 74/512 |
| 4,800,774 | 1/1989 | Hagiwara et al. | 74/512 |
| 4,819,500 | 4/1989 | Musumiya et al. | 74/513 |
| 4,907,468 | 3/1990 | Hagiwara et al. | 74/512 |
| 4,958,607 | 9/1990 | Lundberg | 74/513 |
| 5,044,223 | 9/1991 | Mizuma et al. | 74/512 |
| 5,385,068 | 1/1995 | Ehite et al. | 74/512 |
| 5,398,569 | 3/1995 | Carr | 74/560 |
| 5,408,899 | 4/1995 | Stewart | 74/413 |
| 5,555,774 | 9/1996 | Lauring et al. | 74/512 |

FOREIGN PATENT DOCUMENTS

| | | | |
|---|---|---|---|
| 2516659 | 10/1975 | Germany | 74/513 |
| 4013284 | 10/1991 | Germany | 74/512 |
| 2-249746 | 10/1990 | Japan | 74/512 |
| 4-255012 | 9/1992 | Japan | 74/512 |
| 6-195143 | 7/1994 | Japan | 74/512 |
| WO 8002549 | 11/1980 | WIPO | 74/512 |

*Primary Examiner*—Vinh T. Luong
*Attorney, Agent, or Firm*—Dennison, Meserole, Pollack & Scheiner

[57] ABSTRACT

In an automotive pedal support system, an operating member is supported for operation by a support member, and a return spring operable to apply a force to the operating member in a direction opposite to the direction of depression of the operating member. A projecting portion is formed on one of the support member and the operating member, and a receiving portion is formed on the other of the support member and the operating member. The projecting portion and the receiving portion are coupled to each other to permit operation of the operating member, and constitute a holding mechanism for holding the support member and the operating member in an assembled state.

4 Claims, 7 Drawing Sheets

5,673,589

AUTOMOTIVE PEDAL SUPPORT SYSTEM

BACKGROUND OF THE INVENTION

1. Field of the Invention

This invention relates to automotive operating pedals such as accelerator pedals, brake pedals and clutch pedals.

2. Description of the Prior Art

To obtain the function of this type of operating pedal, at least three elements are necessary. These elements are a support member, an operating member and a return spring. However, actual operating pedals employ, in addition to these three elements, other auxiliary members such as a shaft member for coupling the operating member to the support member for pedal operation (rotary operation) and holding members such as nuts and E rings for holding the shaft member, the support member and the operating member in an assembled state.

Because the auxiliary members as noted above are used in addition to the three elements, the prior art operating pedal requires considerable assembling time. In addition, the management of the component parts involved is complicated.

SUMMARY OF THE INVENTION

An object of the invention is to provide an operating pedal which permits the operating member to be assembled to and supported by the support member with only the three elements, i.e., the support member, the operating member and the return spring, thus reducing the assembling time and simplifying the management of component parts.

To attain the above object, the operating pedal according to the invention has the following constructions.

According to a first aspect of the invention, there is provided an operating pedal comprising a support member, an operating member assembled for pedal operation to the support member, and a return spring operable to apply a force to the operating member in a direction opposite to the direction of depression of the operating member, wherein a projecting portion is formed on one of the support member and the operating member, and a receiving portion is formed on the other of the support member and the operating member, the projecting portion and the receiving portion being coupled to each other such as to permit pedal operation of the operating member and constituting a holding mechanism for holding the support member and the operating member in an assembled state.

According to a second aspect of the invention, there is provided an operating pedal comprising a support member, an operating member assembled for pedal operation to the support member, and a return spring operable to apply a force to the operating member in a direction opposite to the direction of depression of the operating member, wherein a projecting portion is formed on one of the support member and the operating member, and a receiving portion is formed on the other of the support member and the operating member, the projecting portion and the receiving portion being coupled to each other such as to permit pedal operation of the operating member and constituting, together with the return spring, a holding mechanism for holding the support member and the operating member in an assembled state.

According to a third aspect of the invention, there is provided an operating pedal comprising a support member, an operating member assembled for pedal operation to the support member, and a return spring operable to apply a force to the operating member in a direction opposite to the direction of depression of the operating member, wherein a projecting portion is formed on one of the support member and the operating member, and a receiving portion is formed on the other of the support member and the operating member, the projecting portion and the receiving portion being coupled to each other such as to permit pedal operation of the operating member, the support member and the return spring constituting a holding mechanism for holding the support member and the operating member in an assembled state.

With the above construction, the operating member is coupled for pedal operation to the support member by the projecting portion and the receiving portion which are provided in the support member and the operating member. In addition, the support member and the operating member are held in an assembled state by a holding mechanism which is constituted by the projecting portion and the receiving portion, or the projecting portion, the receiving portion and the return spring, or the support member and the return spring.

Thus, the function of the operating pedal can be attained with only the minimum number of prerequisite elements, thus reducing the assembling time and simplifying the management of component parts.

The above and other objects, features and advantages of the invention will become more apparent from the following detailed description of the preferred embodiments when the same is read with reference to the accompanying drawings.

DETAILED DESCRIPTION OF THE PREFERRED EMBODIMENTS

Preferred embodiments of the invention will now be described with reference to the drawings.

First Embodiment

Figure 1A:
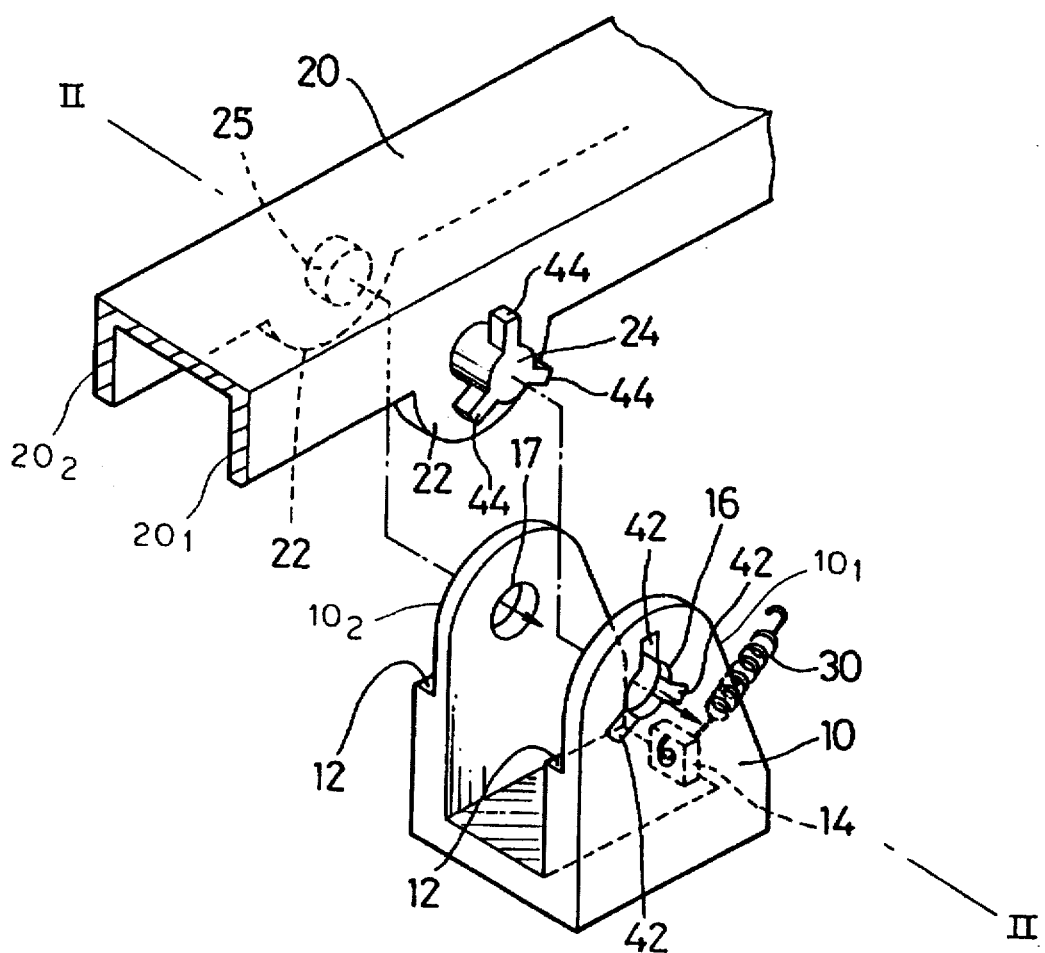
FIGS. 1(A) and 1(B) show the construction of part of an operating pedal according to a first embodiment of the invention.

FIG. 1(A) shows an operating member (i.e., automotive accelerator pedal) according to a first embodiment in exploded perspective. A support member 10 having a substantially U-shaped cross-section as shown in the figures, is secured to, for instance, to a part of a vehicle body. First and second opposing sides $10_1$, $10_2$ of the support member 10 have coaxial shaft reception holes 16 and 17 which constitute a receiving portion. The operating member 20 having a U-shaped cross-section, as shown in the figures, may be a pedal arm of the accelerator pedal. Its first and second opposing sides $20_1$, $20_2$ are provided with integrally formed coaxial shafts 24 and 25 extending in the same direction which constitute a projecting portion. With the shafts 24 and 25 inserted in the shaft insertion holes 16 and 17, the operating member 20 is coupled for pedal rotation with respect to the support member 10.

The support member 10 includes an integrally formed spring retainer 14. A tension spring 30 which is used as a return spring of the operating member, has one end coupled to the spring retainer 14. Its other end is coupled to the right end (as viewed in FIG. 1.(A)) of the operating member 20 after the operating member 20 is assembled onto the support member 10. The tension spring pulls the right end of the operating member 20 downward. As should be apparent, an operator or driver of a vehicle depresses the accelerator and thus the operating member on the left end (as viewed in FIG. 1(A)).

FIG. 2(A) shows, in sectional view, the state where the operating member 20 is assembled onto the support member 10. As is seen from the drawing, one shaft 24 of the operating member 20 is inserted in the associated shaft insertion hole 16 of the support member 10 from the inner side thereof. On the other hand, the other shaft 25 is inserted in the associated shaft insertion hole 17 from the outer side of the support member 10.

The operating member 20 includes integrally formal arcuate portions 22 extending from the opposite side portions. The centers of the arcuate portions 22 are the centers of axes of the shafts 24 and 25. The support member 10 has stopper surfaces 12 for receiving the two arcuate portions 22.

Now, a description will be given to a holding mechanism, by which the operating member 20 is held supported on the support member 10 when in an assembled state. The shaft 24 of the operating member 20 has three, circumferentially outward projecting integral engagement pawls 44 provided at its end. On the other hand, the shaft insertion hole 16 in which the shaft 24 is inserted, has three pawl insertion portions 42 through which the engagement pawls 44 can be passed in the axial direction of the shaft insertion hole 16. That is, the shaft 24 can be inserted through the shaft insertion hole 16 by aligning the engagement pawls 44 and the pawl insertion portions 42 to one another.

Figure 1B:
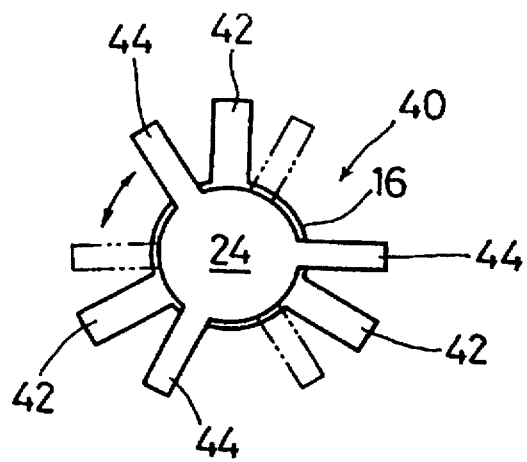

When the operating member 20 has been assembled onto the support member 10 and positioned relative to the same with the tension spring 30 coupled between the two components, the positions of the engagement pawls 44 and the pawl insertion portions 42 deviate from one another as shown in FIG. 1(B). The operating member 20 is rotated together with the two shafts 24 and 25 by pedal operation. The range of rotation of the engagement pawls 44 at this time is between the positions as shown by solid and phantom lines in FIG. 1(B). The operating member 20 is thus held assembled onto the support member 10 at all possible operating positions.

The tension spring 30 used as the return spring may be replaced with a torsion spring or a compression spring provided between the support member 10 and the operating member 20.

In the operating pedal having the construction as described, the separate parts are only the support member 10, the operating member 20 and the tension spring 30 as the return spring. In addition, the operating member 20 is assembled for pedal operation onto the support member 10 by inserting its shafts 24 and 25 through the shaft insertion holes 16 and 17 of the support member 10. Further, the pawl insertion portions 42 of the shaft insertion holes 16 and the engagement pawls 44 of the shaft 24 constitute the holding mechanism 40 for holding the operating member 20 on the support member 10 in an assembled state thereto. It is thus possible to reduce the number of necessary components of the operating pedal and also simplify the assembling thereof.

By the pedal operation, the operating member 20 is caused to rotate about its shafts 24 and 25 against the biasing force of the return spring 30. At this time, the arcuate portions 22 of the operating member 20 are always received by the stopper surfaces 12 of the support member 10. In other words, a partial load which may be applied to the operating member 20 by the pedal operation is received by the stopping surfaces 12, thus preventing irrational forces from acting on the shaft insertion holes 16 and 17 and the shafts 24 and 25.

Figure 2:
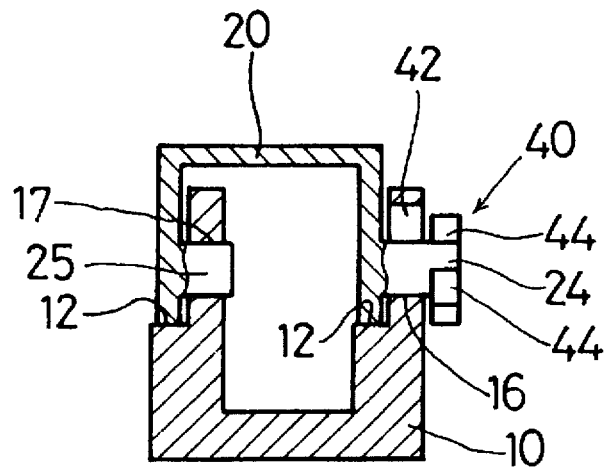
FIG. 2 is a sectional view along line II—II in FIG. 1(A) showing the operating pedal of the first embodiment in an assembled state thereof.
Figures 3A, 3B:
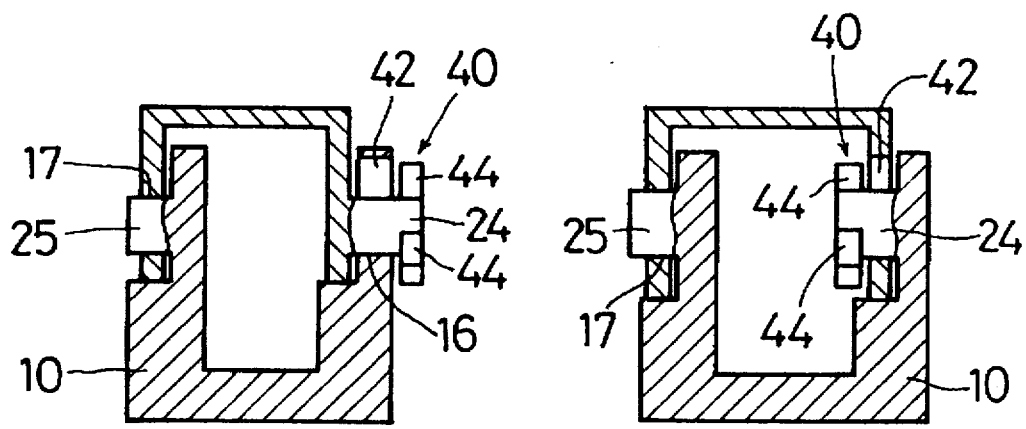
FIGS. 3(A) and 3(B) are sectional views showing modifications of the construction of coupling between a support member and an operating member.

FIGS. 3(A) and 3(B) show, in sectional view, modifications of the construction of coupling of the operating member 20 to the support member 10. The construction shown in FIG. 3(A) is different from that shown in FIGS. 1(A), 1(B) and 2 in that the shaft 25 as a projecting portion is formed on the support member 10 while the associated shaft insertion hole 17 as a receiving portion is formed on the operating member 20. The construction shown in FIG. 3(B) is entirely converse to that shown in FIGS. 1(A), 1(B) and 2. That is, in this case, the shafts 24 and 25 as a projecting portion are formed on the support member 10, while the shaft insertion holes 16 and 17 as a receiving portion are formed in the operating member 20.

As is seen from FIGS. 2, 3(A) and 3(B), in either of these coupling constructions, the operating member 20 is assembled onto the support member 10 by moving it to the right in the drawings along the axis of the shaft insertion holes 16 and 17 and the shafts 24 and 25.

Second Embodiment

Figure 4:
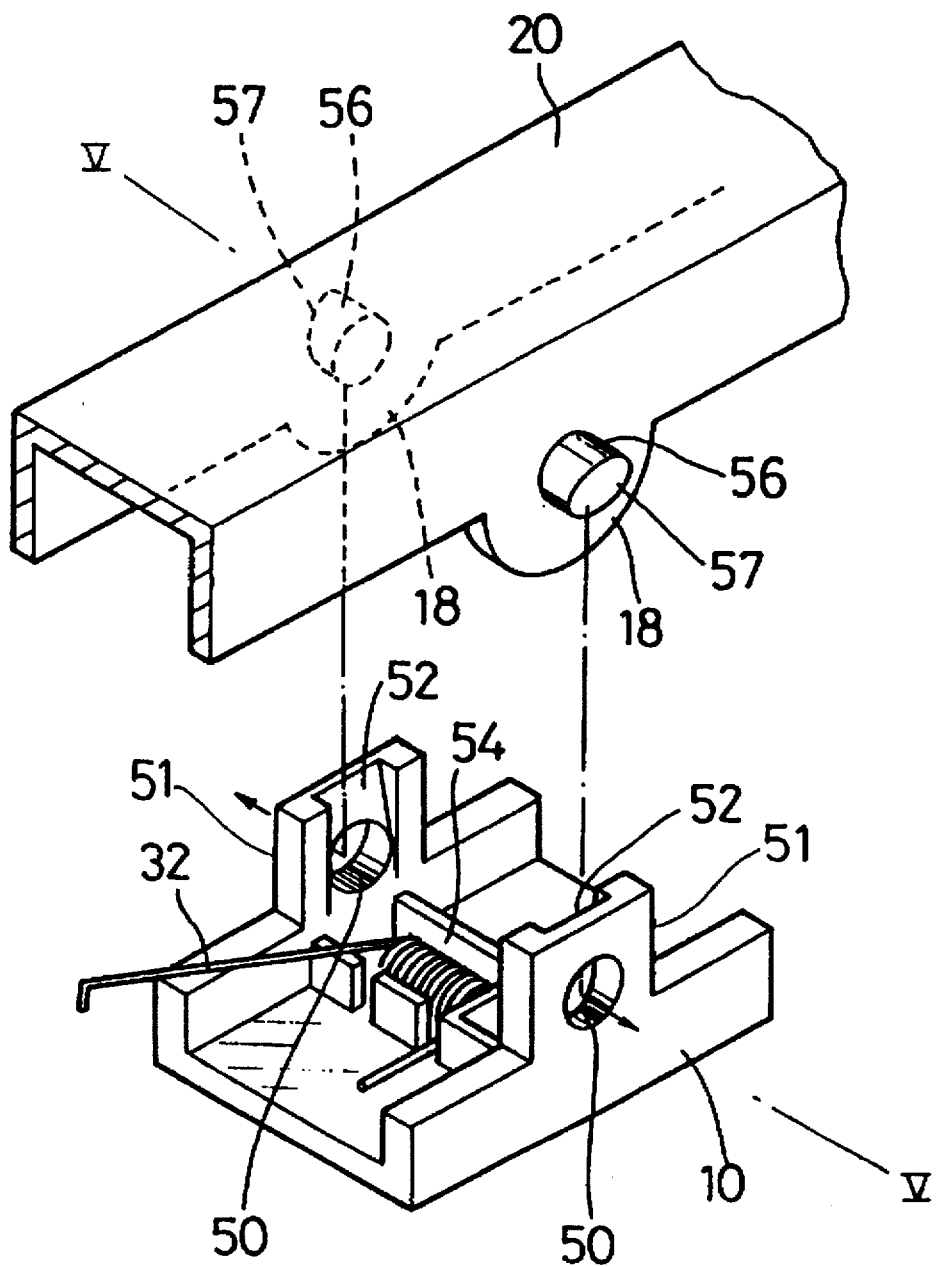
FIG. 4 is an exploded perspective view showing part of an operating pedal according to a second embodiment of the invention.
Figure 5:
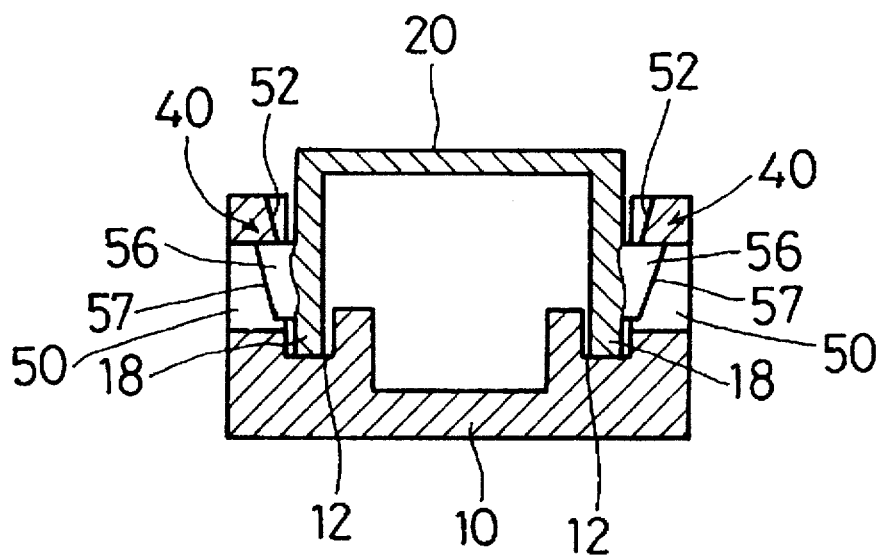
FIG. 5 is a sectional view along line V—V in FIG. 4 showing the operating pedal of the second embodiment in an assembled state thereof.

FIGS. 4 and 5 shows an operating pedal according to a second embodiment of the invention. Parts that are the same as or equivalent to those of the first embodiment are given like reference numbers and their description will not be repeated. As is seen from FIGS. 4 and 5, in this embodiment, opposite sides of the support member 10 have integrally formed projections 51. The opposite sides are capable of elastic flexing. These projections 51 have shaft insertion holes 50 as a receiving portion. The projections 51 each have a guide surface 52 which is inclined inward from the upper end.

The support member 10 includes a spring retainer 54 to which a torsion spring 32 is assembled as a return spring for the operating member.

The operating member 20 has opposite sides with integrally formed shafts 56 as a projecting portion. These shafts 56 each have an end face inclined in a complementary direction to the guide surface 52 of each projection 51 and serve as a guide surface 57.

The operating member 20 can be assembled onto the support member 10 by strongly pushing it down with the shafts 56 disposed on the inner side of the projections 51. As the operating member 20 is pushed down, the projections 51 are caused to flex outward, while also causing inward flexing of opposite side portions 18 of the operating member 20. The guide surfaces 57 of the shafts 56 are thus caused to slide along the guide surfaces 52 of the projections 51. Consequently, the shafts 56 are engaged in the shaft insertion holes 50 and are held in this state, as shown in FIG. 5.

In this way, the operating member 20 is coupled for pedal operation to the support member 10. In this second embodiment, a function of the combination of the projections 51 having the shaft insertion holes 50, the elasticity of the opposite side portions 18 of the operating member 20 with the shafts 56 and the guide surfaces 52 and 57, constitutes a holding mechanism 40 for holding the support member 10 and operating member 20 in an assembled state.

As an alternative, either the projections 18 of the support member 10 or the side portions 18 of the operating member 20 may be elastically flexible, while the other may be rigid.

Figure 6:
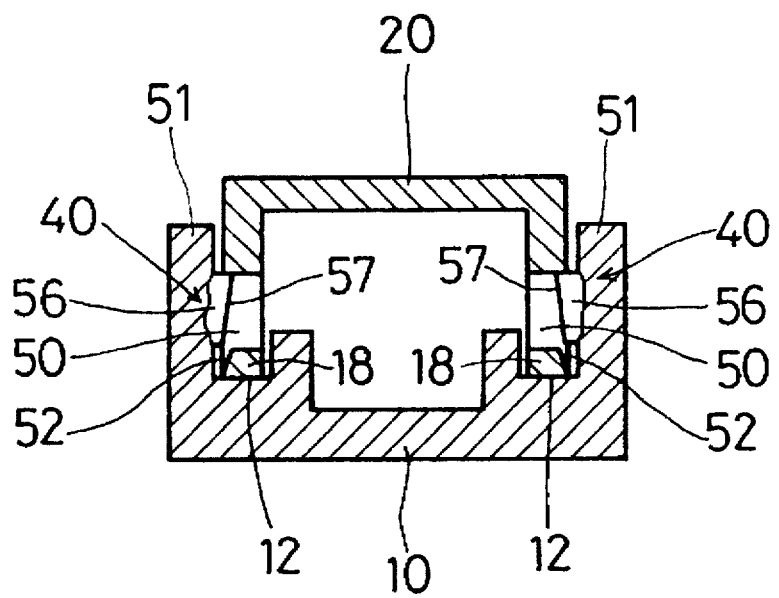
FIG. 6 is a sectional view showing a modification of the construction of coupling between a support member and an operating member in the second embodiment.

FIG. 6 shows, in sectional view, a modification of the construction of coupling between the support member 10 and the operating member 20. In this instance, the shaft insertion holes 50 are formed in opposite side portions of the operating member 20, while the shafts 56 are formed on the inner side of projections 51 of the support member 10. Further, the torsion spring 32 used as return spring in the second embodiment may be replaced with the tension spring 30 used in the first embodiment or a compression spring.

Third Embodiment

Figure 7:
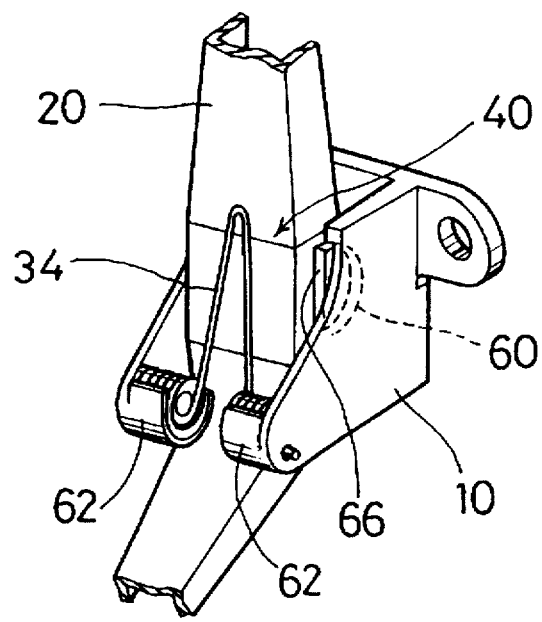
FIG. 7 is a perspective view showing part of an operating pedal according to a third embodiment of the invention.
Figure 8:
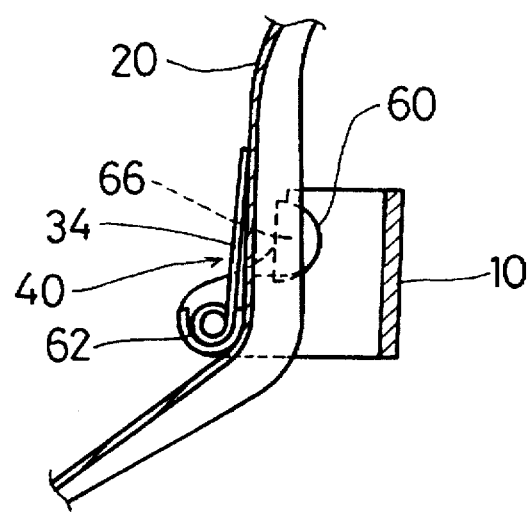
FIG. 8 is a side view showing part of the operating pedal according to the third embodiment.

FIGS. 7 and 8 show an operating pedal according to a third embodiment of the invention. Parts that are the same as or equivalent to those of the first embodiment are given like reference numbers and their description will not be repeated. As is seen from FIGS. 7 and 8, the support member 10 of this embodiment has its opposite side inner surfaces formed with semi-arcuate recesses 60 as a receiving portion. The support member 10 has spring retainers 62 formed integrally with opposite sides thereof. On these spring retainers 62, associated portions of a double torsion spring 34 used as a return spring, are assembled.

The operating member 20 has half arcuate protuberances 66 formed on the opposing sides as a projecting portion. The protuberances 66 are received for rotation in the recesses 60 of the support member 10, and subsequently, the two coil portions of the double torsion coil 34 are assembled onto the spring retainers 62 of the support member 10. Thus, the intermediate portion (i.e., V-shaped non-coiled portion) of the double torsion spring 34 is held in contact with the operating member 20, thus providing an elastic force acting to push the protuberances 66 against the recesses 60. The rotation of the operating member 20 caused by this elastic force is restricted as part of the member 20 strikes the spring retainers 62.

With this construction, the operating member 20 is coupled for pedal operation to the support member 10, and these components are held in this state. That is, in this embodiment, the recesses 60 as a receiving portion, the protuberances 66 as a projecting portion and the double torsion spring 34 as a return spring constitute a holding mechanism 40 for holding the support member 10 and the operating member 20 in an assembled state.

Fourth Embodiment

Figure 9:
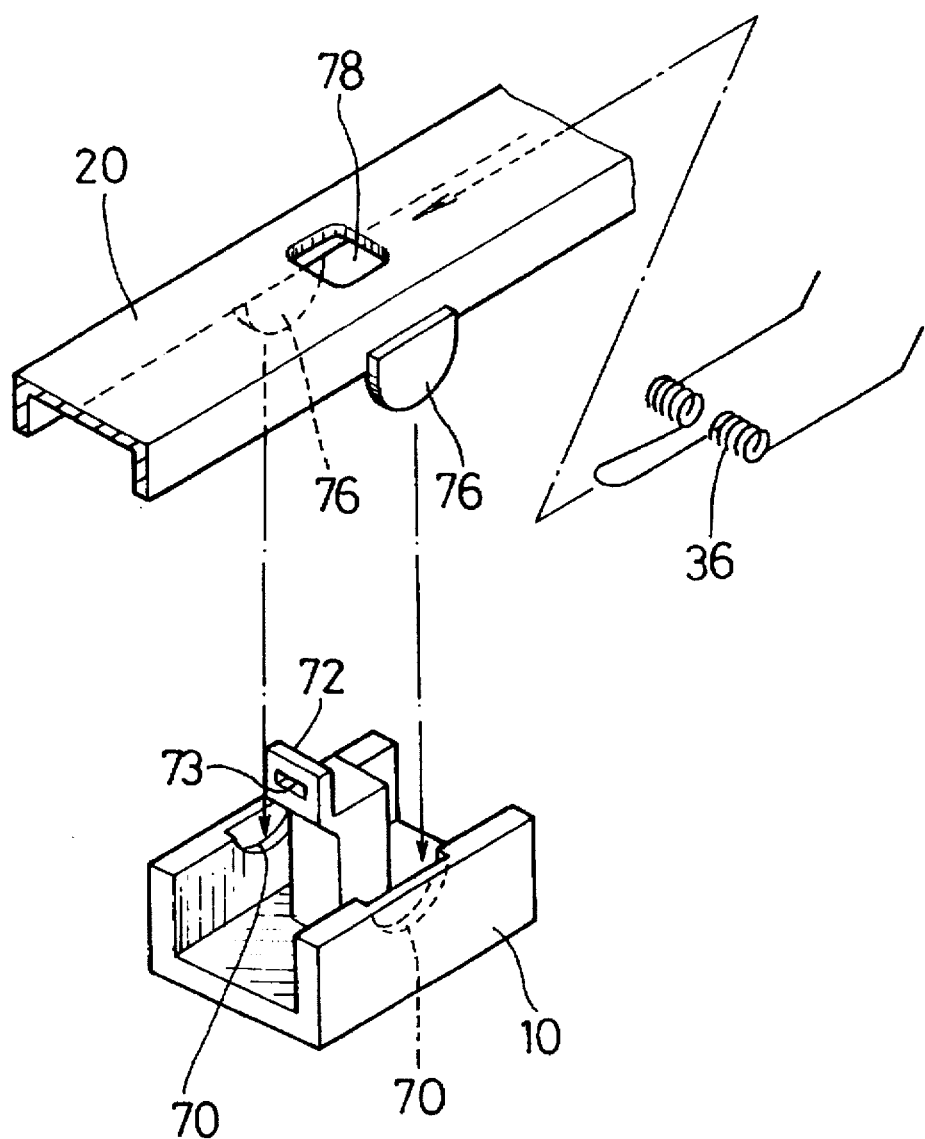
FIG. 9 is an exploded perspective view showing part of an operating pedal according to a fourth embodiment of the invention.
Figure 10:
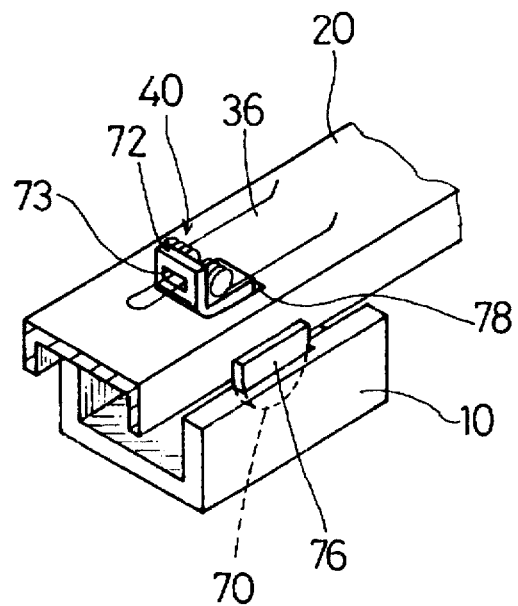
FIG. 10 is a perspective view showing the operating pedal of the fourth embodiment in an assembled state thereof.

FIGS. 9 and 10 shows an operating pedal according to a fourth embodiment of the invention. Parts that are the same as or equivalent to those of the first embodiment are given like reference numbers and their description will not be repeated. As is seen from FIGS. 9 and 10, the support member 10 of this embodiment has semi-arcuate recesses 70 formed as a receiving portion on opposite side inner surfaces thereof. On the other hand, the support member 10 has an integral central spring retainer 72 projecting upward. The spring retainer 72 has an engagement hole 73 formed adjacent to its end. An end of a torsion spring 36 used as a return spring can be inserted in the engagement hole 73.

The operating member 20 has arcuate portions 76 formed with opposite sides thereof and serving as a projecting portion. The arcuate portions 76 are capable of rotation relative to the recesses 70 of the support member 10. The operating member 20 further has an opening or hole 78 through which the spring retainer 72 is inserted.

In assembling, after the arcuate portions 76 of the operating member 20 have been coupled to the recesses 70 of the support member 10, the end of the torsion spring 36 is inserted through the engagement hole 73 of the spring retainer 72 projecting from the opening 78 of the operating member 20, as shown in FIG. 10. In consequence, the torsion spring 36 provides a biasing force to the operating member 20 in a returning direction and also holds the support member 10 and the operating member 20 in an assembled state. That is, in this embodiment, the spring retainer 72 as part of the support member 10 and the torsion spring 36 used as a return spring constitute a holding mechanism.

Figure 11:
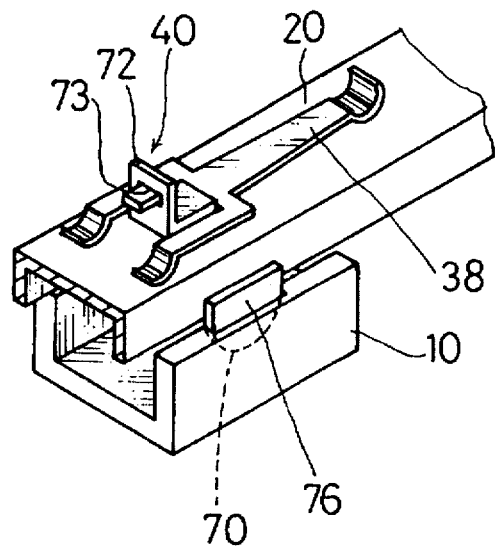
FIG. 11 is a perspective view showing a modification of a return spring in the fourth embodiment.

The torsion spring 36 in this embodiment may be replaced with a leaf spring 38 as shown in FIG. 11.

While some preferred embodiments and modifications thereof have been described in the foregoing, it is to be understood that various other changes and modifications in the details of design may be made without departing from the scope of the invention as defined in the appended claims.

What is claimed is:

1. An automotive pedal support system comprising:

a support member including a receiving portion, an operating member including a projecting portion, said projecting portion and said receiving portion being configured for permitting the operating member to be depressed in an assembled state, a return spring operating to apply a force to the operating member in a direction which is opposite to the direction in which the operating member is depressed, and means for holding the support member and the operating member in said assembled state, said support member has a U-shaped cross-section, the receiving portion are first and second opposing sides which include coaxial shaft reception openings, said operating member has a U-shaped cross-section, the projecting portion are first and second opposing sides including coaxial shafts extending in the same direction, said means for holding is configured as a first one of the operating member opposing sides having a shaft extension formed with three circumferentially outward projecting engagement pawls, and a first one of the support member opposing sides having the shaft opening formed with three pawl insertion openings through which the projecting pawls can be passed only when aligned.

2. The support system according to claim 1, wherein said support member first and second opposing sides are formed to include a stopping surface, said operating member opposing sides are formed to include an arcuate portion configured to conform and to cooperate with said stopping surface so as to prevent irrational forces from acting on the shafts and the shaft insertion openings.

3. An automotive pedal support system comprising:

a support member including a receiving portion, an operating member including a projecting portion, said projecting portion and said receiving portion being configured for permitting the operating member to be depressed in an assembled state, a return spring operating to apply a force to the operating member in a direction which is opposite to the direction in which the operating member is depressed, and means for holding the support member and the operating member in said assembled state, said operating member has a U-shaped cross-section, the projection portion are first and second opposing sides one of which includes a shaft reception opening and the other of which includes a coaxial shaft, said support member has a U-shaped cross-section, the receiving portion are first and second opposing sides, one of which includes a shaft extension and the other of which includes a coaxial shaft extension reception opening, said means for holding is configured as a first one of the support member opposing sides having the shaft extension formed with three circumferentially outward projecting engagement pawls, and a first one of the operating member opposing sides having the shaft extension reception opening formed with three pawl insertion openings through which the projecting pawls can be passed only when aligned.

4. An automotive pedal support system comprising:

a support member including a receiving portion, an operating member including a projecting portion, said projecting portion and said receiving portion being configured for permitting the operating member to be depressed in an assembled state, a return spring operating to apply a force to the operating member in a direction which is opposite to the direction in which the operating member is depressed, and means for holding the support member and the operating member in said assembled state, said operating member has a U-shaped cross-section, the projection portion are first and second opposing sides one of which includes a shaft reception opening and the other of which includes a coaxial shaft, said support member has a U-shaped cross-section, the receiving portion are first and second opposing sides one of which includes a shaft reception opening and the other of which includes a coaxial shaft, said operating member has a U-shaped cross-section, the projecting portion are first and second opposing sides one of which includes a shaft extension and the other of which includes a coaxial shaft extension reception opening, said means for holding is configured as a first one of the operating member opposing sides having the shaft extension formed with three circumferentially outward projecting engagement pawls, and a first one of the support member opposing sides having the shaft extension reception opening formed with three pawl insertion openings through which the projecting pawls can be passed only when aligned.

* * * * *